United States Patent [19]
Brown et al.

[11] Patent Number: 4,842,235
[45] Date of Patent: Jun. 27, 1989

[54] AUTOMOBILE CLIP BOARD AND LIGHT UNIT

[76] Inventors: Robert L. Brown, P.O. Box 10843, Glendale, Calif. 91209; George Spector, 233 Broadway RM 3815, New York, N.Y. 10007

[21] Appl. No.: 186,028

[22] Filed: Apr. 25, 1988

[51] Int. Cl.⁴ .............................................. F21V 33/00
[52] U.S. Cl. ................... 248/447.2; 248/452; 362/99; 108/45
[58] Field of Search ................ 248/452, 447.1, 441.1, 248/442.2, 447.2; 108/45, 44; 362/98, 99, 183

[56] References Cited

U.S. PATENT DOCUMENTS

| | | | |
|---|---|---|---|
| 2,603,896 | 7/1952 | Bennett | 248/447.1 X |
| 3,281,109 | 10/1966 | Levandowski | 248/447.1 |
| 3,452,188 | 6/1969 | Zidon et al. | 362/99 |
| 3,723,720 | 3/1973 | Schmidt et al. | 362/183 |
| 3,875,396 | 4/1975 | Webb | 362/99 |
| 4,142,172 | 2/1979 | Menard | 362/183 X |
| 4,751,620 | 6/1988 | Wright et al. | 362/99 |

FOREIGN PATENT DOCUMENTS

| | | | |
|---|---|---|---|
| 885350 | 11/1971 | Canada | 108/44 |
| 1552291 | 10/1970 | Fed. Rep. of Germany | 248/447.1 |
| 352008 | 11/1970 | Fed. Rep. of Germany | 362/98 |
| 1416622 | 9/1965 | France | 108/44 |

Primary Examiner—Alvin C. Chin-Shue

[57] ABSTRACT

An illuminated clipboard for a motor vehicle is provided that includes a male cigarette lighter adapter plug which is placed into a female cigarette lighter socket on a dashboard for supply power to a lamp of the clipboard. The male adapter plug stabilizes the clipboard so that a person can see information and write on the clipboard.

1 Claim, 1 Drawing Sheet

U.S. Patent        Jun. 27, 1989        4,842,235
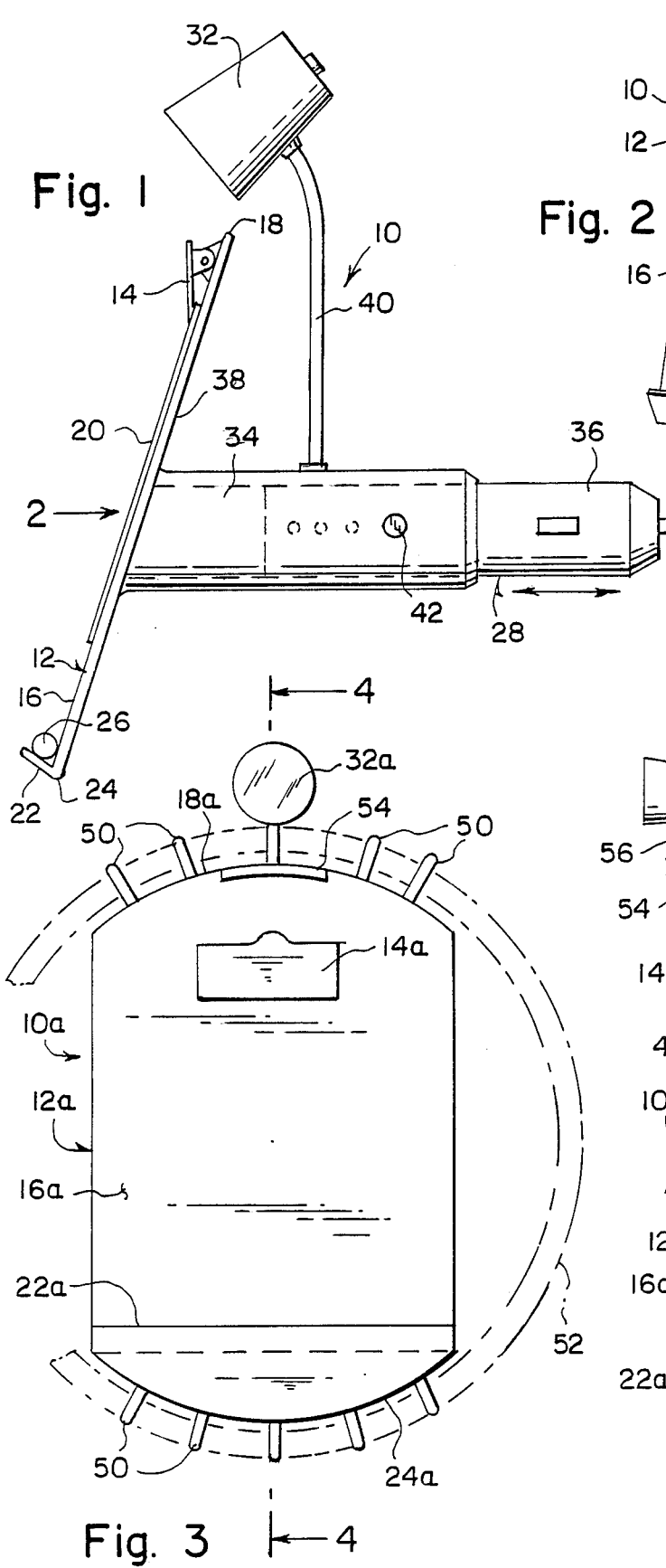
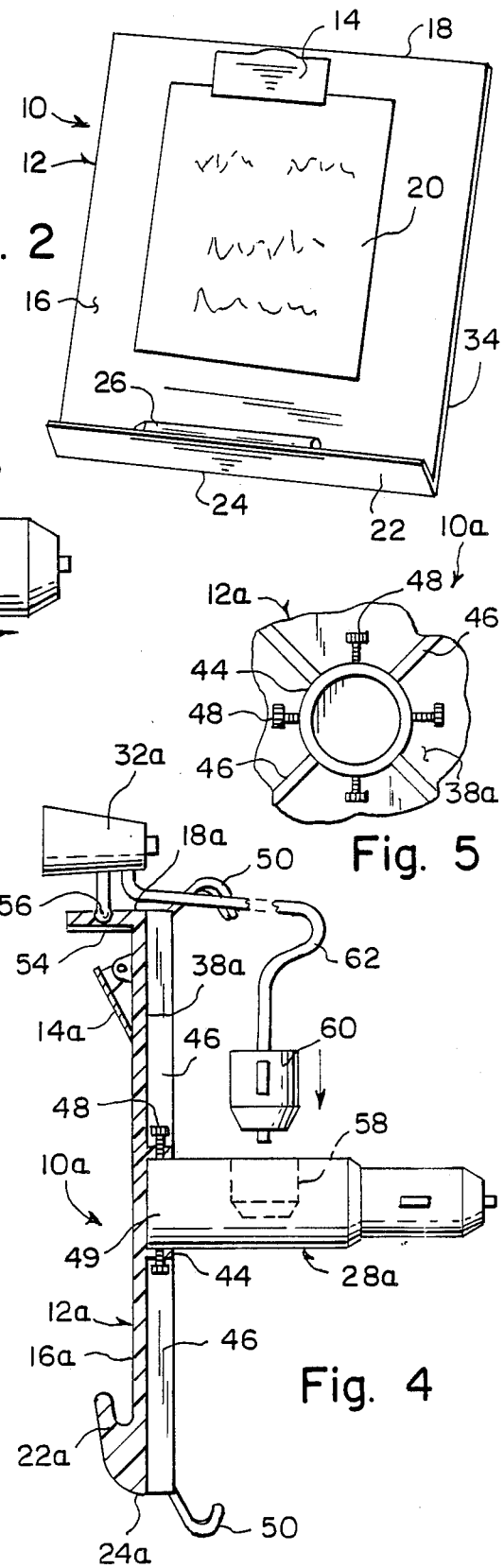

4,842,235

AUTOMOBILE CLIP BOARD AND LIGHT UNIT

BACKGROUND OF THE INVENTION

The instant invention relates generally to portable holding devices and more specifically it relates to a motor vehicle illuminated clipboard.

Numerous portable holding devices have been provided in prior art that are adapted to support various items adjacent to the instrument panels of automobiles. For example, U.S. Pat. Nos. 3,104,895; 4,053,133 and 4,619,396 all are illustrative of such prior art. While these units may be suitable for the particular purpose to which they address, they would not be as suitable for the purposes of the present invention as heretofore described.

SUMMARY OF THE INVENTION

A primary object of the present invention is to provide a motor vehicle illuminated clipboard that will overcome the shortcomings of the prior art devices.

Another object is to provide a motor vehicle illuminated clipboard that has a male cigarette lighter adapter which plugs into a standard cigarette lighter socket on a dashboard for supplying power to a lamp on the clipboard and stabilizing the clipboard so that a person can see information or write on the clipboard.

An additional object is to provide a motor vehicle illuminated clipboard whereby the clipboard can be removed from the male cigarette lighter adapter and attached onto steering wheel of the motor vehicle so that the person is in more comfort when using the clipboard.

A further object is to provide a motor vehicle illuminated clipboard that is simple and easy to use.

A still further object is to provide a motor vehicle illuminated clipboard that is economical in cost to manufacture.

Further objects of the invention will appear as the description proceeds.

To the accomplishment of the above and related objects, this invention may be embodied in the form illustrated in the accompanying drawings, attenting being called to the fact, however, that the drawings are illustrative only, and that changes may be made in the specific construction illustrated and described within the scope of the appended claims

BRIEF DESCRIPTION OF THE DRAWING FIGURES

FIG. 1 is a side view of the invention.

FIG. 2 is a front perspective view taken in direction of arrow 2 in FIG. 1 showing the clipboard.

FIG. 3 is a front view of a modification in which the clipboard is removable from the cigarette lighter adapt so as to be placed onto a steering wheel of a motor vehicle with hook fingers.

FIG. 4 is a side cross sectional view taken along line 4—4 in F 3, showing the structure therein in greater detail.

FIG. 5 is a partial rear view of the clipboard in FIG. 3, showing the radial arms, collar and set screws in greater detail.

DETAILED DESCRIPTION OF THE PREFERRED EMBODIMENTS

Turning now descriptively to the drawings, in which similar reference characters denote similar elements throughout the several views, FIGS. 1 and 2 illustrate an illuminated clipboard 10 for a motor vehicle (not shown) consisting of a generally rectangular flat-faced panel 12. A spring biased clip 14 is mounted onto front surface 16 near upper end 18 of the panel 12 for engaging and retaining articles 20 thereto such as writing paper, a map, etc. A flange 22 is formed onto the front surface 16 across lower end 24 of the panel 12 for holding additional articles 26 thereon such as a pencil, book, etc. A male cigarette lighter adapter plug 28 is transversely mounted centrally to rear surface 30 of the panel 12 so that when the adapter plug 28 is placed into a female cigarette lighter socket on a dashboard (not shown) of the motor vehicle the panel 12 will be held thereto for viewing by a person (not shown) in the motor vehicle. A lamp 32 is electrically connected to the male adapter plug 28 so that the lamp 32 can illuminate the articles 20 on the panel 12 of the clipboard 10.

The male adapter plug 28 is in two pieces 34 and 36 which are telescopic for horizontal adjustment and is transversely mounted at a slight angle centrally to the rear surface 38 of the panel 12 so that when the male adapter plug 28 is placed into the female socket on the dashboard of the motor vehicle, the panel 12 will be tilted back at a slight angle from the vertical for proper viewing of the articles 20 and 26 on the panel 12. A flexible neck 40 extends between the lamp 32 and side of the one piece 34 of the male adapter plug 28 adjacent the panel 12 so that the lamp 32 can be properly positioned to illuminate the articles 20 and 26 on the panel 12 of the clipboard 10. A set screw 42 is threadably disposed into side of the one piece 34 of the male adapter plug 28 adjacent the panel 12 for securing the horizontal adjustment thereof.

FIGS. 3, 4 and 5 show a modified illuminated clipboard 10a wherein the panel 12a has a curved upper end 18a and a curved lower end 24a. A collar 44 is formed centrally at the rear surface 38a of the panel 12a and has a plurality of radial ribs 46 extending from the collar 44 along the rear surface 38a thereof for strengthening the panel 12a, whereby the male adapter plug 28a; is detachable from the collar 44. Set screws 48 are each threadable into the collar 44 for securing and releasing the distal end 49 of the male adapter plug 28a in the collar. A plurality of finger hooks 50 extend from the curved upper end 18a and the curved lower end 24a of the panel 12a so that the panel can be removably attached to a steering heel 52, shown in phantom of the motor vehicle A ledge 54 is formed onto the front surface 16a at the upper end 18a of the panel 12a so that the lamp 32a can be pivotly connected at 56 to the ledge 54. The male adapter plug 28a has an auxiliary female cigarette lighter socket 58 transversely connected therein. An auxiliary male cigarette lighter adapter plug 60 is electrically connected, via an elongated cord 62, to the lamp 32a so that the auxiliary male adapter plug 60 can be placed into the auxiliary female socket 58 when the collar 44 is connected to the male adapter plug 28a. The auxiliary male adapter plug 60 can be placed into the female socket on the dashboard of the motor vehicle when the finger hooks 50 on the panel 12a are connected to the steering wheel 50 of the motor vehicle.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An illuminated clipboard for a motor vehicle which comprises:
   (a) a generally rectangular flat faced panel;
   (b) a spring biased clip mounted onto front surface near upper end of said panel for engaging and retaining articles thereto;
   (c) a flange formed onto the front surface across lower end of said panel for holding additional articles thereon;
   (d) a male cigarette lighter adapter plug transversely mounted centrally to rear surface of said panel so that then said adapter plug is placed into a female cigarette lighter socket on a dashboard of the motor vehicle, said panel will be held thereto viewing by a person in the motor vehicle; and
   (e) a lamp electrically connected to said male adapter plug so that said lamp can illuminate the articles on said panel of said clipboard;
   (f) said panel having a curved upper end, and a curved lower end;
   (g) a collar formed centrally at the rear surface of said panel and having a plurality of radial ribs extending from said collar along the rear surface thereof for strengthening said panel, whereby said male adapter plug is detachable from said collar;
   (h) a plurality of set screws, each threadable into said collar for securing and releasing a distal end of said male adapter plug in said collar;
   (i) a plurality of finger hooks extending from the curved upper end and the curved lower end of said panel so that said panel can be removably attached to a steering wheel of the motor vehicle
   (j) a ledge formed onto the front surface at the upper end of said panel so that said lamp can be pivotly connected to said ledge;
   (k) said male adapter plug having an auxiliary female cigarette lighter socket transversely connected therein; and
   (l) an auxiliary male cigarette lighter adapter plug electrically connected to said lamp so that said auxiliary male adapter plug can be placed into said auxiliary female socket when said collar is connected to said male adapter plug and said auxiliary male adapter plug can be placed into said female cigarette lighter socket on the dashboard of the motor vehicle when said finger hooks on said panel are connected to the steering wheel of the motor vehicle.

* * * * *